(12) United States Patent
Li et al.

(10) Patent No.: US 11,256,021 B2
(45) Date of Patent: Feb. 22, 2022

(54) PLATE WAVEGUIDE

(71) Applicant: BEIJING LLVISION TECHNOLOGY CO., LTD., Beijing (CN)

(72) Inventors: Yong Li, Beijing (CN); Fei Wu, Beijing (CN); Zhenrong Zheng, Beijing (CN)

(73) Assignee: BEIJING LLVISION TECHNOLOGY CO., LTD., Beijing (CN)

( * ) Notice: Subject to any disclaimer, the term of this patent is extended or adjusted under 35 U.S.C. 154(b) by 156 days.

(21) Appl. No.: 16/755,518

(22) PCT Filed: Oct. 8, 2018

(86) PCT No.: PCT/CN2018/109308
§ 371 (c)(1),
(2) Date: Apr. 10, 2020

(87) PCT Pub. No.: WO2019/072145
PCT Pub. Date: Apr. 18, 2019

(65) Prior Publication Data
US 2020/0249389 A1 Aug. 6, 2020

(30) Foreign Application Priority Data

Oct. 11, 2017 (CN) .......................... 201710939814.5
Apr. 28, 2018 (CN) .......................... 201810397732.7

(51) Int. Cl.
*G02B 27/01* (2006.01)
*F21V 8/00* (2006.01)

(52) U.S. Cl.
CPC ........... *G02B 6/0056* (2013.01); *G02B 6/005* (2013.01); *G02B 27/0172* (2013.01); *G02B 2027/012* (2013.01)

(58) Field of Classification Search
CPC .................. G02B 6/0056; G02B 2027/012
See application file for complete search history.

(56) References Cited

U.S. PATENT DOCUMENTS

2017/0052377 A1    2/2017  Amitai

FOREIGN PATENT DOCUMENTS

| CN | 203773160 U | 8/2014 |
| CN | 104216042 A | 12/2014 |

(Continued)

*Primary Examiner* — Omar R Rojas
(74) *Attorney, Agent, or Firm* — John A. Miller; Shumaker, Loop & Kendrick, LLP

(57) ABSTRACT

A slab waveguide, comprising a plate having parallel surfaces and a cascade light splitting film. The plate is used for receiving and transmitting incident waveguide light which bears a transmitted image. The splitting film is disposed in the plate, intersects the upper and lower surface of the plate, and is used for reflecting the incident waveguide light out of the slab waveguide to form an actual image. In order to avoid mirror image coincidence, the waveguide needs to satisfy: $|\arcsin(n \times \sin(90°-4a+b)) - \arcsin(n \times \sin(90°-2a-b))| > 2\omega$, wherein a is an inclined angle between the cascade light splitting film and the lower surface of the plate, b is an inclined angle between central image light of the incident waveguide light and the lower surface of the plate, $\omega$ is an image display viewing angle of the transmitted image, and n is the refractive index of the plate.

18 Claims, 6 Drawing Sheets

(56) References Cited

FOREIGN PATENT DOCUMENTS

| | | | |
|---|---|---|---|
| CN | 106556929 | A | 4/2017 |
| CN | 107621700 | A | 1/2018 |
| TW | 201734562 | A | 10/2017 |

PLATE WAVEGUIDE

CROSS-REFERENCE TO RELATED APPLICATIONS

This application is a National Stage application of International Application No. PCT/CN2018/109308 filed Oct. 8, 2018, which claims priority to Chinese Patent Application Serial No. 201710939814.5, filed Oct. 11, 2017, and Chinese Patent Application Serial No. 201810397732.7, filed Apr. 28, 2018.

BACKGROUND

Field

The present disclosure relates to the technical field of optical devices for displaying, and particularly to a plate waveguide.

Discussion

Helmet-mounted display (HMD) has a wide range of applications in various modern technology fields. Whether it is to see desired data in the real-world field of view at the same time, or to experience a full-fledged sense when the visual images change, or to expand the visual ability of the eye with an infrared sensor, a microscope or an electron microscope, it can be achieved with the HMD. Based on the principle of total reflection, a light beam needs to be continuously reflected and transmitted on the upper and lower surfaces of the waveguide and finally transmitted to the eye. However, in the process of transmitting the images by the waveguide, opposite mirror images are formed, which affects the sharpness of the images.

SUMMARY

In order to solve the problem that the opposite mirror images are formed and the sharpness of the image is thus affected in the process of transmitting the image by the waveguide, the present disclosure provides a plate waveguide for eliminating the mirror image.

The present disclosure provides a plate waveguide, comprising:

a parallel plate having two surfaces parallel to each other and configured for transmitting incident light carrying a transmitted image; and cascaded splitting films disposed in the parallel plate and not parallel to an upper surface and a lower surface of the parallel plate, and configured for reflecting the incident light out of the plate waveguide to form an ideal image to an eye;

a refractive index of the parallel plate, a field of view, an angle of the splitting films, and an angle of the incident light are required to satisfy following relationships:

a condition of total reflection transmission:

$$90°-b-\omega > \arcsin(1/n);$$

a condition where the mirror image does not overlap with the ideal image, and there is no ghosting:

$$|\arcsin(n \times \sin(90°-4a+b)) - \arcsin(n \times \sin(90°-2a-b))| > 2\omega;$$

wherein, a is an included angle between the cascaded splitting films and the lower surface of the parallel plate;

b is an included angle between a center image light of the incident light and the lower surface of the parallel plate;

$2\omega$ is the field of view of the transmitted image in the plate waveguide, $\omega$ is half of the field of view of the transmitted image;

n is the refractive index of the parallel plate.

The present disclosure further provides a plate waveguide, comprising:

a parallel plate having two surfaces parallel to each other and configured for receiving and transmitting incident light carrying a transmitted image; and cascaded splitting films disposed in the parallel plate and not parallel to an upper surface and a lower surface of the parallel plate, and configured for reflecting the incident light out of the plate waveguide to form an ideal image to an eye, it is assumed that an included angle between the cascaded splitting films 200 and the lower surface of the plate waveguide is a, an included angle between a center image light of the incident light and the lower surface of the parallel plate is b, a field of view of the transmitted image in the plate waveguide is $2\omega$, half of the field of view of the transmitted image is $\omega$, a refractive index of the parallel plate is n, a distance from the parallel plate of the plate waveguide to a pupil of an eye is d, and a diameter of the pupil of the eye is D, when $a > b, 90°-2a-b > 90°-4a+b$, when the mirror image light and the ideal image light at the distance enter the eye, a horizontal deviation L is:

$$\operatorname{Tan}(\arcsin(n \times \sin(90°-2a-b-\omega))) \times d - \operatorname{Tan}(\arcsin(n \times \sin(90°-4a+b+\omega))) \times d,$$

when $a < b, 90°-2a-b < 90°-4a+b$, when the mirror image light and the ideal image light at the distance enter the eye, the horizontal deviation L is:

$$\operatorname{Tan}(\arcsin(n \times \sin(90°-4a+b-\omega))) \times d - \operatorname{Tan}(\arcsin(n \times \sin(90°-2a-b+\omega))) \times d$$

and the following relationship is satisfied: $L > D/2$.

According to the plate waveguide with the above configuration, preferably $L > D$.

According to the plate waveguide with the above configuration, preferably the incident angle at half maximum of reflectance of the cascaded splitting films is $90°-0.5 \times (|a+b|+|a-b|)$;

a transmissivity of the cascaded splitting films in an incident angle range of ideal image light $[0, 90°-a-b+\omega]$ is $1-R$, $0.1 \leq R < 0.5$;

the transmissivity of the cascaded splitting films in an incident angle range of mirror image light $[90°-|b-a|-\omega, 90°]$ is more than 96%; and the transmissivity of the cascaded splitting films at the incident angle at half maximum of reflectance is $(2-R)/2$, $0.1 \leq R < 0.5$, wherein, R is a reflectance.

The present disclosure further provides a plate waveguide, comprising:

a parallel plate having two surfaces parallel to each other and configured for transmitting incident light carrying a transmitted image; and cascaded splitting films disposed in the parallel plate and not parallel to an upper surface and a lower surface of the parallel plate, and configured for reflecting the incident light out of the plate waveguide to form an ideal image to an eye, and an incident angle at half maximum of reflectance of the cascaded splitting films is $90°-0.5 \times (|a+b|+|a-b|)$;

a transmissivity of the cascaded splitting films in an incident angle range of ideal image light [0, 90°−a−b+ω] is 1−R, 0.1≤R<0.5;

the transmissivity of the cascaded splitting films in an incident angle range of mirror image light [90°−|b−a|−ω, 90°] is more than 96%;

the transmissivity of the cascaded splitting films at the incident angle at half maximum of reflectance is (2−R)/2, 0.1≤R<0.5;

wherein, a is an included angle between the cascaded splitting films 200 and the lower surface of the parallel plate;

b is an included angle between a center image light of the incident light and the lower surface of the parallel plate;

ω is half of a field of view of the transmitted image;

n is a refractive index of the parallel plate; and

R is a reflectance.

According to the plate waveguide with the above configuration, preferably when the included angle between the cascaded splitting films and the lower surface of the parallel plate is larger than or equal to the included angle between the center image light of the incident light and the lower surface of the parallel plate, the refractive index of the parallel plate and the field of view satisfy the following relationships:

$$\arcsin(n \times \sin(90°-2a-b)) - \arcsin(n \times \sin(90°-4a+b)) > 2\omega;$$

$$90°-b-\omega > \arcsin(1/n); \text{ and}$$

$$90°-2a+b-\omega > \arcsin(1/n).$$

According to the plate waveguide with the above configuration, preferably when the included angle between the cascaded splitting films and the lower surface of the parallel plate is smaller than the included angle between the center image light of the incident light and the lower surface of the parallel plate, the refractive index of the parallel plate and the field of view satisfy the following relationships:

$$\arcsin(n \times \sin(90°-4a+b)) + \arcsin(n) \times \sin(2a+b-90°) > 2\omega;$$

$$90°-b-\omega > \arcsin(1/n); \text{ and}$$

$$90°-2a+b-\omega > \arcsin(1/n).$$

According to the plate waveguide with the above configuration, preferably the refractive index of the parallel plate is larger than 1.5.

According to the plate waveguide with the above configuration, preferably the incident light has a predetermined polarization state, and the plate waveguide further comprises quarter-wave plates disposed on the upper and lower surfaces of the parallel plate respectively, and configured for totally reflecting the incident light and switching the predetermined polarization state of the incident light.

According to the plate waveguide with the above configuration, preferably the polarization state of the incident light is P state or S state, and the cascaded splitting films has a polarization selectivity, and transmit all S-state light or all P-state light and reflect part of the other polarization state light.

According to the plate waveguide with the above configuration, preferably when the polarization state of the incident light is the P state and a first reflection occurs on the lower surface of the parallel, the P-state light is switched to S-state light after an odd number times of reflections on the upper and lower surfaces of the parallel plate, and the S-state light is switched to the P-state light after an even number times of reflections on the upper and lower surfaces of the parallel plate, and the cascaded splitting films transmit all the P-state light and reflect part of the S-state light, or transmit all the S-state light and reflect part of the P-state light.

According to the plate waveguide with the above configuration, preferably when the polarization state of the incident light is the P state and a first reflection occurs on the upper surface of the parallel, the P-state light is switched to the S-state light after an odd number times of reflections on the upper and lower surfaces of the parallel plate, and the S-state light is switched to the P-state light after an even number times of reflections on the upper and lower surfaces of the parallel plate, and the cascaded splitting films transmit all the P-state light and reflect part of the S-state light, or transmit all the S-state light and reflect part of the P-state light.

According to the plate waveguide with the above configuration, preferably when the polarization state of the incident light is the S state and a first reflection occurs on the lower surface of the parallel, the S-state light is switched to the P-state light after an odd number times of reflections on the upper and lower surfaces of the parallel plate, and the P-state light is switched to the S-state light after an even number times of reflections on the upper and lower surfaces of the parallel plate, and the cascaded splitting films transmit all the P-state light and reflect part of the S-state light, or transmit all the S-state light and reflect part of the P-state light.

According to the plate waveguide with the above configuration, preferably when the polarization state of the incident light is the S state and a first reflection occurs on the upper surface of the parallel, the S-state light is switched to the P-state light after an odd number times of reflections on the upper and lower surfaces of the parallel plate, and the P-state light is switched to the S-state light after an even number times of reflections on the upper and lower surfaces of the parallel plate, and the cascaded splitting films transmit all the P-state light and reflect part of the S-state light, or transmit all the S-state light and reflect part of the P-state light.

The technical effect of the present disclosure is that the plate waveguide of the present disclosure effectively solves the problem of mirror image in near-eye display system with the cascaded splitting films, reduces the brightness of the mirror image to less than 5% of the ideal image, and does not increase the volume and weight of the system. The adhesive layer has high uniformity, which increases the energy threshold of the transmitted beam and reduces the possibility of bursting in high-energy laser applications.

BRIEF DESCRIPTION OF THE DRAWINGS

Drawings used in the embodiments or the prior art description will be briefly explained below in order to illustrate the embodiments of the present disclosure or the technical solutions in the prior art. Obviously, the drawings in the following description merely show some embodiments of the present disclosure. For those of ordinary skill in the art, other drawings can be obtained based on these drawings without creative effort.

Figure 1:
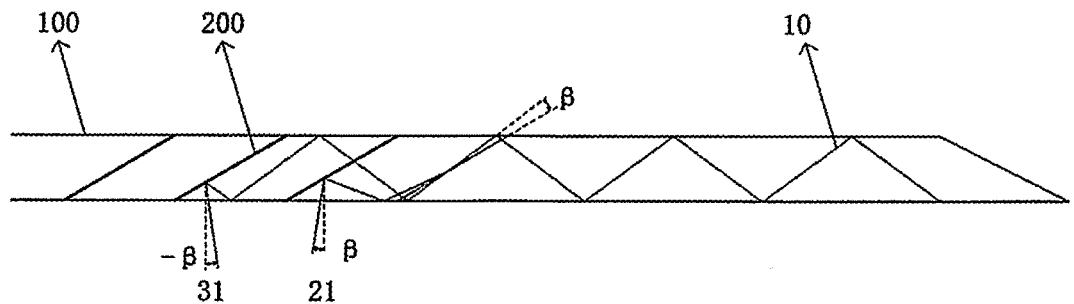
FIG. 1 is a schematic diagram of an optical path of a plate waveguide in the prior art.

REFERENCE SIGNS parallel plate 100
cascaded splitting films 200
quarter-wave plate 300
collimating optical system 400
image source 500
incident light 10
mirror image light 21
mirror image center light 22
ideal image light 31
ideal image center light 32

DETAILED DESCRIPTION OF THE EMBODIMENTS

The technical solutions in embodiments of the present disclosure will be described below with reference to the drawings in the embodiments of the present disclosure. The described embodiments are merely some of embodiments of the present disclosure, but not all possible embodiments. Based on the embodiments in the present disclosure, all other embodiments obtained by those skilled in the art without creative effort shall fall into the scope of the present disclosure.

FIG. 1 is a schematic diagram of an optical path of a plate waveguide in the prior art. As shown in FIG. 1, in the process of transmitting an image by the traditional plate waveguide, incident light 10 needs to be continuously reflected on the upper and lower surfaces of the plate waveguide based on the principle of total reflection and transmitted therebetween. When incident on the cascaded splitting films 200, the light beam reflected on the upper surface of the plate waveguide and the light beam reflected on the lower surface of the plate waveguide are reflected out of the plate waveguide, and opposite left and right images are thereby formed, which affects the sharpness of the ideal image.

Figure 2:
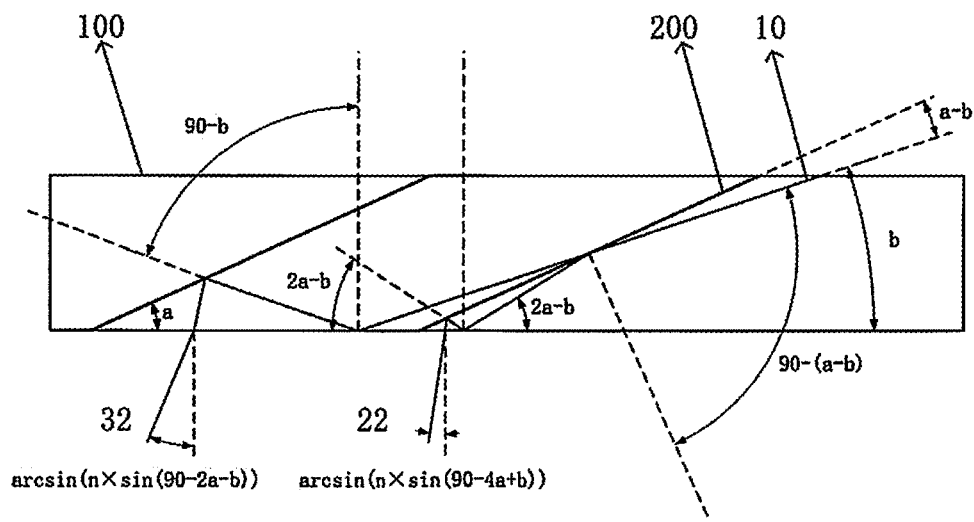
FIG. 2 is an analytical schematic diagram of an optical path of a mirror image generated by reflection of a front surface of cascaded splitting films in the prior art.
Figure 3:
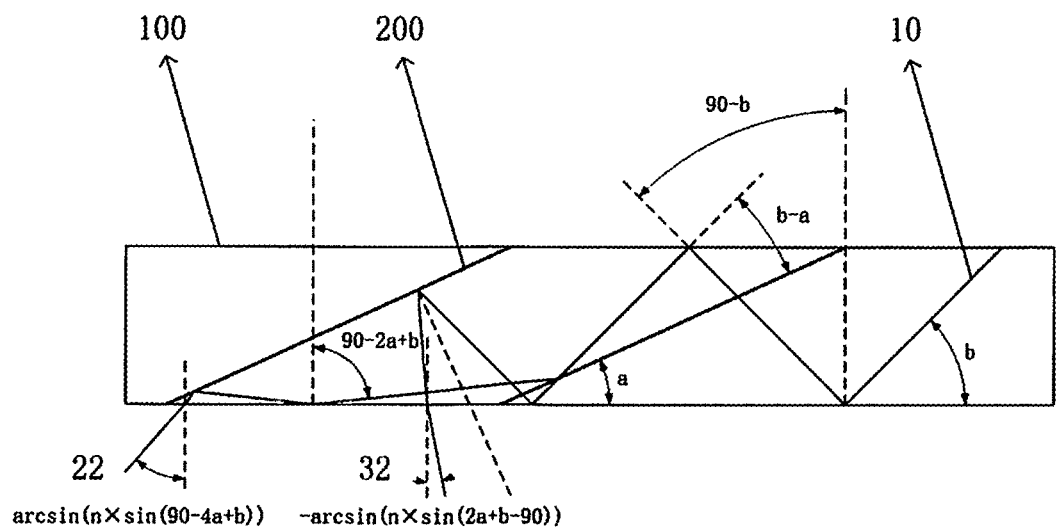
FIG. 3 is an analytical schematic diagram of an optical path of a mirror image generated by reflection of a rear surface of the cascaded splitting films in the prior art.

Based on different positions at which the light beam is reflected by the cascaded splitting films 200, the generation of the mirror image is classified into two conditions: one is that the light reflected on the upper surface enters the front surfaces of the cascaded splitting films 200 and is then reflected thereon to exit, the other one is that the light reflected on the upper surface enters the film array and is then reflected thereon to exit. With reference to FIG. 2 and FIG. 3, the foregoing two conditions of the generation of the mirror image are described respectively.

FIG. 2 is an analytical schematic diagram of an optical path of a mirror image generated by reflections of the front surfaces of the cascaded splitting films in the prior art. As shown in FIG. 2, it can be known through the trigonometric functions and the law of reflection that:

the total reflection angle of an ideal image light 31 in the plate waveguide is 90°−b;

the total reflection angle of a mirror image light 21 in the plate waveguide is 90°−2a+b;

the exit angle of an ideal image center light 32 is arcsin (n×sin(90°−2a−b));

the exit angle of a mirror image center light 22 is arcsin(n×sin(90°−4a+b));

Wherein, the glass refractive index of the plate waveguide is indicated as n, the included angle between the cascaded splitting films 200 and the lower surface of the plate waveguide is indicated as a, the included angle between the incident light and the lower surface of the plate waveguide is indicated as b, and at this case b<a. Since the mirror image center light 22 and the ideal image center light 32 have different exit angles, the light reflected on the upper surface enters the front surfaces of the cascaded splitting films 200 and is then reflected thereon to exit, and a mirror image is formed. Therefore, the mirror image affects the sharpness of the ideal image.

FIG. 3 is an analytical schematic diagram of an optical path of a mirror image generated by reflections of the rear surfaces of the cascaded splitting films in the prior art. As shown in FIG. 3, it can be known through the trigonometric functions and the law of reflection that:

the total reflection angle of the ideal image light 31 in the plate waveguide is 90°−b;

the total reflection angle of the mirror image light 21 in the plate waveguide is 90°−2a+b;

the exit angle of the ideal image center light 32 is −arcsin (n×sin (2a+))b−90°; and the exit angle of the mirror image center light 22 is arcsin(n×sin(90°−4a+b));

wherein, the glass refractive index of the plate waveguide is indicated as n, the included angle between the cascaded splitting films 200 and the lower surface of the plate waveguide is indicated as a, the included angle between the incident light and the lower surface of the plate waveguide is indicated as b, and at this case b>a. Since the mirror image center light 22 and the ideal image center light 32 have different exit angles, the light reflected on the upper surface enters the rear surfaces of the cascaded splitting films 200 and is reflected thereon to exit, and a mirror image is formed. Therefore, the mirror image affects the sharpness of the ideal image.

In order to solve the problem that the opposite left and right images are formed and the sharpness of the image is thus affected in the above process of transmitting the image by the waveguide, the present disclosure provides a plate waveguide to eliminate the mirror image.

Figure 4:
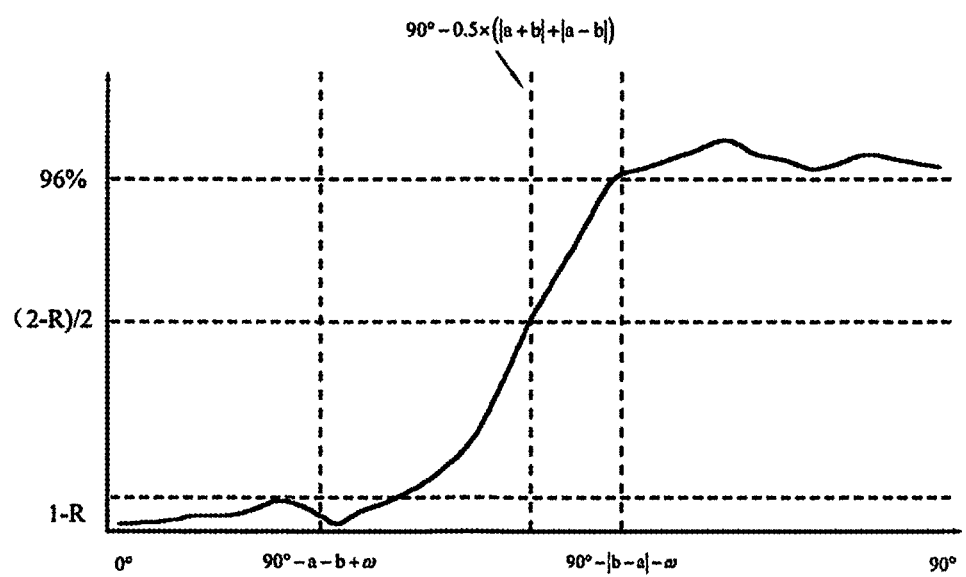
FIG. 4 is a schematic diagram of transmissivity curve of the cascaded splitting films according to a first embodiment of the present disclosure.
Figure 5:
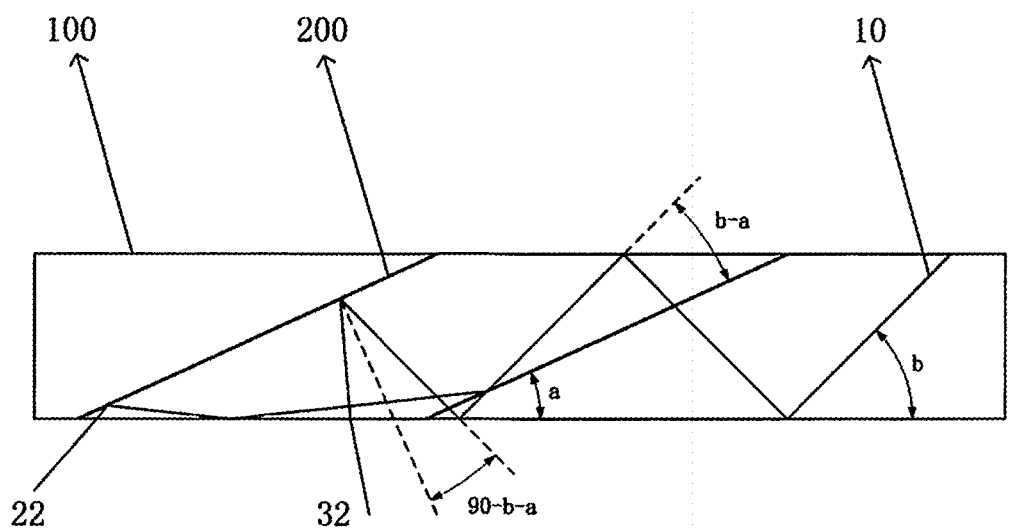
FIG. 5 is a schematic diagram of an optical path in a plate waveguide when a<b.
Figure 6:
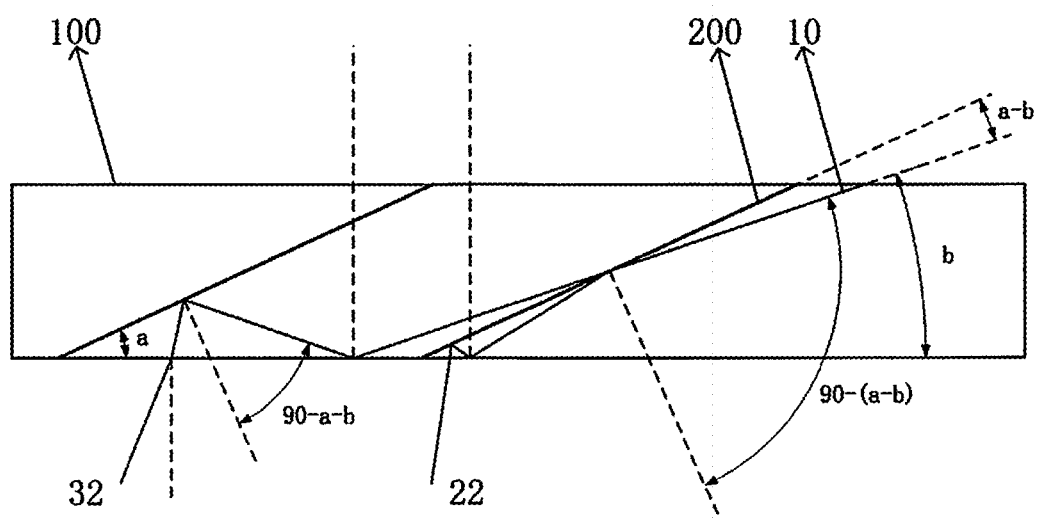
FIG. 6 is a schematic diagram of an optical path in a plate waveguide when a>b.

[First Embodiment] FIG. 4 is a schematic diagram of a transmissivity curve of cascaded splitting films according to a first embodiment of the present disclosure. With reference to FIGS. 5 and 6, the plate waveguide of the present embodiment is used for transmitting an image and eliminating a mirror image of the transmitted image to form an ideal image to an eye, and includes a parallel plate 100 and cascaded splitting films 200. The parallel plate 100 is configured to receive and transmit an incident light 10 which carries the transmitted image. The cascaded splitting films 200 are disposed in the parallel plate 100 and are not parallel to the upper and lower surfaces of the parallel plate 100, and are configured for reflecting the incident light 10 out of the plate waveguide to form the ideal image. The incident angle at half maximum of reflectance of the cascaded splitting films 200 is 90°−0.5×(|a+b|+|a−b|). The cascaded splitting films 200 each has transmissivity of 1−R in an incident angle range of ideal image light [0, 90°−a−b+ω], 0.1≤R<0.5. The cascaded splitting films 200 each has transmissivity of more than 96% in an incident angle range of mirror image light [90°−|b−a|−w, 90°]. The transmissivity of the cascaded splitting films 200 at the incident angle at half maximum of reflectance is (2−R)/2, 0.1≤R<0.5. Wherein, the included angle between the cascaded splitting films 200 and the lower surface of the parallel plate 100 is indicated as a, the included angle between the incident light 10 and the lower surface of the parallel plate 100 is indicated as b, ω is half of the field of view of the transmitted image; the glass refractive index of the plate waveguide is indicated as n, and R is reflectance. In general, the glass refractive index of the plate waveguide is greater than 1.5. Herein, ω is the angle of the part of the field of view of the transmitted image on one side of the normal line, and thus the field of view of the transmitted image in the plate waveguide is 2ω as it includes the angle on both sides of the normal line.

The incident light 10 emitted by an image source 500 is collimated into collimated light at various angles by a collimating optical system 400, and then enters the parallel plate 100. The incident light 10 now satisfy the total reflection condition and is transmitted in the plate waveguide until it reaches the cascaded splitting films 200. Then based on the comparison of the included angle a between the cascaded splitting films 200 and the lower surface of the parallel plate 100 and the included angle b between the incident light 10 and the lower surface of the parallel plate 100, there are two conditions for the light path after transmission to the cascaded splitting films 200: one is a<b, the other is a>b. FIG. 5 is a schematic diagram of the optical path in the plate waveguide when a<b. FIG. 6 is a schematic diagram of the optical path in then plate waveguide when a>b. The following will illustrate how the plate waveguide of this embodiment of the present disclosure transmits and eliminates the mirror image of the transmitted image to form the ideal image in the above two conditions with reference to FIG. 5 and FIG. 6.

As shown in FIG. 5, the included angle b between the incident light 10 and the lower surface of the parallel plate 100 is larger than the included angle a between the cascaded splitting films 200 and the upper and lower surfaces of the parallel plate 100. It can be known through the trigonometric functions and the law of reflection that:

the incident angle of the mirror image light 21 on the cascaded splitting films 200 is: 90°−b+a;

the incident angle of the ideal image light 31 on the cascaded splitting films 200 is: 90°−b−a;

the field of view is 2ω;

apparently, the incident angle of the mirror image light 21 on the cascaded splitting films 200 is larger than the incident angle of the ideal image light 31 on the cascaded splitting films 200; and the cascaded splitting films 200 of the plate waveguide of the embodiment of the present disclosure have different transmissivity at different angles: the transmissivity in the angle range of [90°−|b−a|−ω, 90°] (simplified as [90°−b+a−ω, 90°]) is more than 96%, and the transmissivity in the angle range [0, 90°−a−b+ω] is 1−R. In this way, most part of the mirror image light 21 passes through the cascaded splitting films 200 and transmits backward, and the ideal image light 31 is reflected by the cascaded splitting films 200 out of the plate waveguide to form the ideal image.

As shown in FIG. 6, the included angle b between the incident light 10 and the lower surface of the parallel plate 100 is smaller than the included angle a between the cascaded splitting films 200 and the lower surface of the parallel plate 100. It can be known through the trigonometric functions and the law of reflection that:

the incident angle of the mirror image light 21 on the cascaded splitting films 200 is: 90°−a+b;

the incident angle of the ideal image light 31 on the cascaded splitting films 200 is: 90°−b−a;

the field of view is 2ω;

apparently, the incident angle of the mirror image light 21 on the cascaded splitting films 200 is larger than the incident angle of the ideal image light 31 on the cascaded splitting films 200;

the cascaded splitting films 200 of the plate waveguide of the embodiment of the present disclosure each has different transmissivity at different angles: the transmissivity in the angle range of [90°−|b−a−ω, 90°] (simplified as [90°−b+a−ω, 90°]) is more than 96%, and the transmissivity in the angular range [0, 90°−a−b+ω] is 1−R. In this way, most part of the mirror image light 21 passes through the cascaded splitting films 200 and transmits backward, and the ideal image light 31 is reflected by the cascaded splitting films 200 out of the plate waveguide to form the ideal image.

Figure 7:
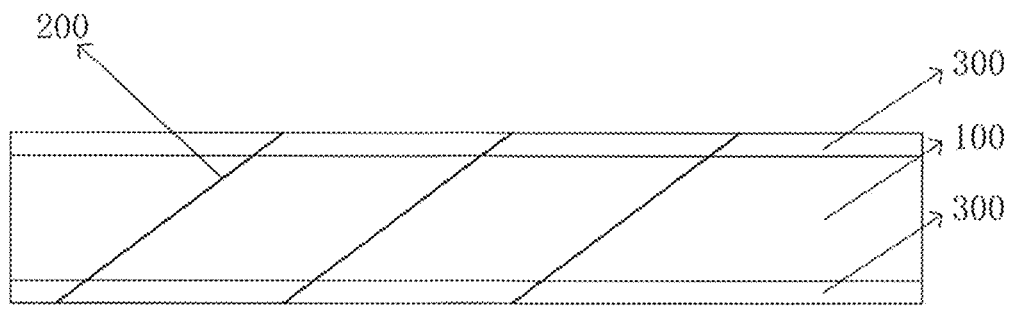
FIG. 7 is a schematic structural diagram of a plate waveguide according to a second embodiment of the present disclosure.
Figure 8:
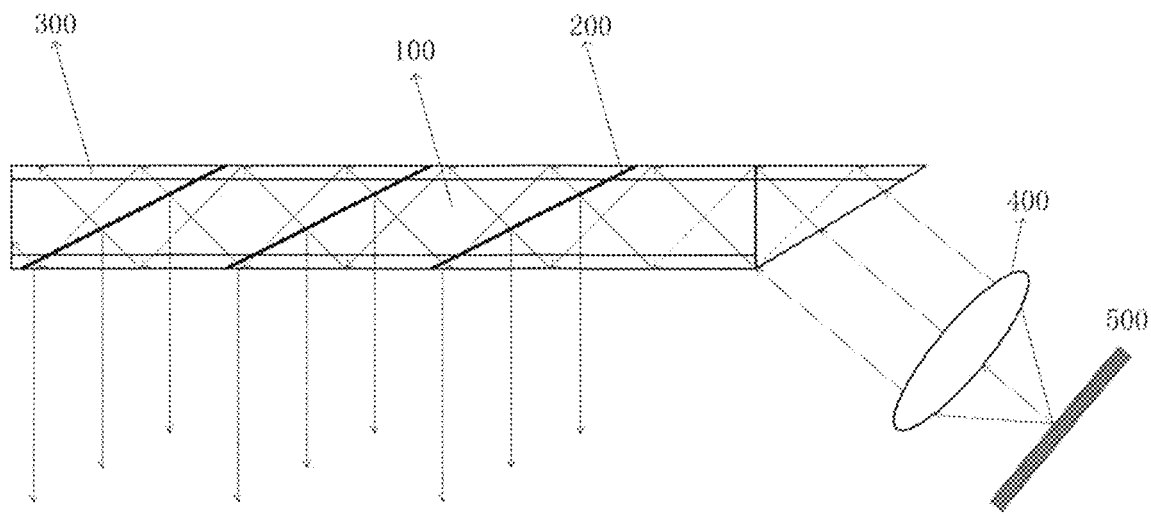
FIG. 8 is a schematic diagram of an optical path in a plate waveguide according to the second embodiment of the present disclosure.

[Second Embodiment] FIG. 7 is a schematic structural diagram of a plate waveguide according to a second embodiment of the present disclosure, and FIG. 8 is a schematic diagram of an optical path in a plate waveguide according to the same. With reference to FIG. 7 and FIG. 8, the plate waveguide in this embodiment includes the parallel plate 100, the cascaded splitting films 200 and two quarter-wave plates 300. The parallel plate 100 receives and transmits the incident light 10 carrying the transmitted image. The incident light 10 has a predetermined polarization state, and the polarization state includes an S state and a P state. The two quarter-wave plates 300 are attached to the upper and lower surfaces of the parallel plate 100 respectively, and are configured for totally reflecting the incident light 10 and switching the polarization state of the incident light 10. The cascaded splitting films 200 are arranged in the parallel plate 100 between the two quarter-wave plates 300, and are not parallel to the upper and lower surfaces of the parallel plate 100 and the two quarter-wave plates 300, forming an acute angle in this embodiment, and are configured for reflecting the incident light 10 with a predetermined polarization state out of the plate waveguide to form an ideal image to an eye. In general, the glass refractive index of the plate waveguide is greater than 1.5.

Figure 9:
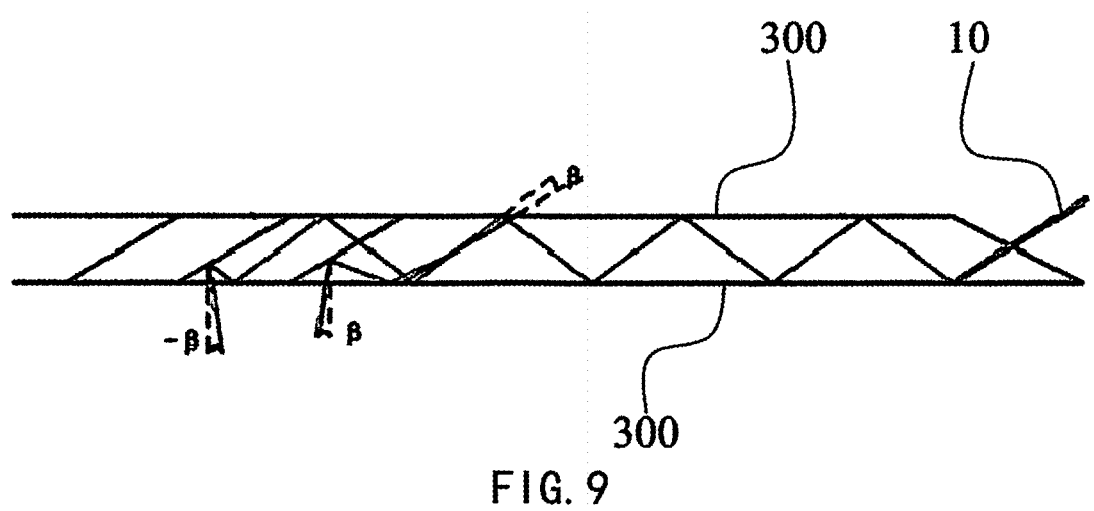
FIG. 9 is a schematic diagram of an optical path when the first reflection occurs on a lower surface of a plate.
Figure 10:
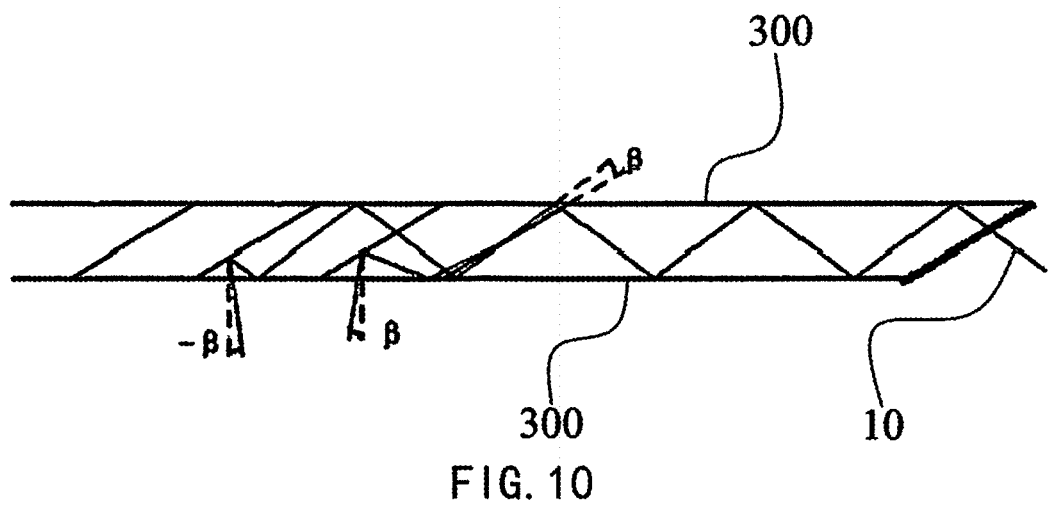
FIG. 10 is a schematic diagram of an optical path when the first reflection occurs on an upper surface of a plate.

FIG. 9 is a schematic diagram of an optical path when the first reflection of the incident light 10 occurs on the lower surface of the parallel plate. FIG. 10 is a schematic diagram of an optical path when the first reflection the incident light 10 occurs on the upper surface of the parallel plate. Several specific types of embodiments are described with reference to FIGS. 9 and 10.

In a specific implementation, the incident light 10 carries the transmitted image, the polarization state of the incident light 10 is the P state, and the first reflection of the incident light 10 occurs on the upper surface of the upper quarter-wave plate 300 (see FIG. 10). As a result, when the light is reflected an odd number of times, the light is reflected by the upper surface of the upper quarter-wave plate 300, and when the light is reflected an even number of times, the light is reflected by the lower surface of the lower quarter-wave plate 300. During the total reflection transmission of incident light 10, due to the effect of the upper quarter-wave plate 300, the polarization state (i.e., the P state) of incident light 10 is switched to the S state after reflection thereon; and due to the effect of the lower quarter-wave plate 300, the polarization state (i.e., the S state) of the incident light 10 is switched back to the P state after reflection thereon. The polarization state of incident light 10 was switched for many times during the total reflection transmission until it is transmitted to the cascaded splitting films 200. The cascaded splitting films 200 have a polarization selectivity, that is, they transmit all the P-state light and reflect part of the S-state light. Therefore, only the S-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the P state, and the first reflection of the incident light 10 occurs on the lower surface of the lower quarter-wave plate 300 (see FIG. 9). As a result, when the light is reflected an odd number of times, the light is reflected by the lower surface of the lower quarter-wave plate 300, and when the light is reflected an even number of times, the light is reflected by the upper surface of the upper quarter-wave plate 300. During the total reflection transmission of incident light 10, due to the effect of the lower quarter-wave plate 300, the polarization state (i.e., the P state) of incident light 10 is switched to the S state after reflection thereon; and due to the effect of the upper quarter-wave plate 300, the polarization state (i.e., the S state) of the incident light 10 is switched back to the P state after reflection thereon. The polarization state of incident light 10 was switched for many times during the total reflection transmission until it is transmitted to the cascaded splitting films 200. The cascaded splitting films 200 have a polarization selectivity, that is, they transmit all the P-state light and reflect part of the S-state light. Therefore, only the S-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the P state, and the first reflection of the incident light 10 occurs on the upper surface of the upper quarter-wave plate 300 (see FIG. 10). As a result, when the light is reflected an odd number of times, the light is reflected by the upper surface of the upper quarter-wave plate 300, and when the light is reflected an even number of times, the light is reflected by the lower surface of the lower quarter-wave plate 300. During the total reflection transmission of incident light 10, due to the effect of the upper quarter-wave plate 300, the polarization state (i.e., the P state) of incident light 10 is switched to the S state after reflection thereon; and due to the effect of the lower quarter-wave plate 300, the polarization state (i.e., the S state) of the incident light 10 is switched back to the P state after reflection thereon. The polarization state of incident light 10 is switched for many times during the total reflection transmission until it is transmitted to the cascaded splitting films 200. The cascaded splitting films 200 have a polarization selectivity, that is, they transmit all the S-state light and reflect part of the P-state light. Therefore, only the P-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the P state, and the first reflection of the incident light 10 occurs on the lower surface of the lower quarter-wave plate 300 (see FIG. 9). As a result, when the light is reflected an odd number of times, the light is reflected by the lower surface of the lower quarter-wave plate 300, and when the light is reflected an even number of times, the light is reflected by the upper surface of the upper quarter-wave plate 300. During the total reflection transmission of incident light 10, due to the effect of the lower quarter-wave plate 300, the polarization state (i.e., the P state) of the incident light 10 is switched to the S state after reflection thereon; and due to the effect of the upper quarter-wave plate 300, the polarization state (i.e., the S state) of the incident light 10 is switched back to the P state after reflection thereon. The polarization state of incident light 10 is switched for many times during the total reflection transmission until it is transmitted to the cascaded splitting films 200. The cascaded splitting films 200 have a polarization selectivity, that is, they transmit all the S-state light and reflect part of the P-state light. Therefore, only the P-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the S state, and the first reflection of the incident light 10 occurs on the upper surface of the upper quarter-wave plate 300 (see FIG. 10). As a result, when the light is reflected an odd number of times, the light is reflected by the upper surface of the upper quarter-wave plate 300, and when the light is reflected an even number of times, the light is reflected by the lower surface of the lower quarter-wave plate 300. During the total reflection transmission of incident light 10, due to the effect of the upper quarter-wave plate 300, the polarization state (i.e., the S state) of the incident light 10 is switched to the P state after reflection thereon; and due to the effect of the lower quarter-wave plate 300, the polarization state (i.e., the P state) of the incident light 10 is switched back to the S state after reflection thereon. The polarization state of incident light 10 is switched for many times during the total reflection transmission until it is transmitted to the cascaded splitting films 200. The cascaded splitting films 200 have a polarization selectivity, that is, they transmit all the P-state light and reflect part of the S-state light. Therefore, only the S-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the S state, and the first reflection of the incident light 10 occurs on the upper surface of the upper quarter-wave plate 300 (see FIG. 10). As a result, when the light is reflected an odd number of times, the light is reflected by the upper surface of the upper quarter-wave plate 300, and when the light is reflected an even number of times, the light is reflected by the lower surface of the lower quarter-wave plate 300. During the total reflection transmission of incident light 10, due to the effect of the upper quarter-wave plate 300, the polarization state (i.e., the S state) of incident light 10 is switched to the P state after reflection thereon; and due to the effect of the lower quarter-wave plate 300, the polarization state (i.e., the P state) of the incident light 10 is switched back to the S state after reflection thereon. The polarization state of incident light 10 is switched for many times during the total reflection transmission until it is transmitted to the cascaded splitting films 200. The cascaded splitting films 200 have a polarization selectivity, that is, they transmit all the S-state light and reflect part of the P-state light. Therefore, only the P-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the S state, and the first reflection of the incident light 10 occurs on the lower surface of the lower quarter-wave plate 300 (see FIG. 9). As a result, when the light is reflected an odd number of times, the light is reflected by the lower surface of the lower quarter-wave plate 300, and when the light is reflected an even number of times, the light is reflected by the upper surface of the upper quarter-wave plate 300. During the total reflection transmission of incident light 10, due to the effect of the lower quarter-wave plate 300, the polarization state (i.e., the S state) of the incident light 10 is switched to the P state after reflection thereon; and due to the effect of the upper quarter-wave plate 300, the polarization state (i.e., the P state) of the incident light 10 is switched back to the S state after reflection thereon. The polarization state of incident light 10 is switched for many times during the total reflection transmission until it is transmitted to the cascaded splitting films 200. The cascaded splitting films 200 have a polarization selectivity, that is, they transmit all the P-state light and reflect part of the S-state light. Therefore, only the S-state incident light 10 with the same exit angle is reflected out of the plate waveguide by the cascaded splitting films 200, thereby eliminating the mirror image of the transmitted image.

In a specific implementation, the incident light 10 carries the transmitted image, the polarization state of the incident light 10 is the S state, and the first reflection of the incident light 10 occurs on the lower surface of the lower quarter-wave plate 300 (see FIG. 9). As a result, when the light is reflected in an odd number of times, the light is reflected by the lower surface of the lower quarter-wave plate 300, and when the light is reflected in an even number of times, the light is reflected by the upper surface of the upper quarter-wave plate 300. During the total reflection transmission of incident light 10, due to the effect of the lower quarter-wave plate 300, the polarization state (i.e., the S state) of the incident light 10 is switched to the P state after reflection thereon; and due to the effect of the lower quarter-wave plate 300, the polarization state (i.e., the P state) of the incident light 10 is switched back to the S state after reflection thereon. The polarization state of incident light 10 is switched for many times during the total reflection transmission until it is transmitted to the cascaded splitting films 200. The cascaded splitting films 200 have a polarization selectivity, that is, they transmit all the S-state light and reflect part of the P-state light. Therefore, only the P-state incident light 10 with the same exit angle is reflected out of the plate waveguide by the cascaded splitting films 200, thereby eliminating the mirror image of the transmitted image.

It should be noted that the technical solution of the embodiment in FIG. 7 can be implemented separately. For the polarized image source 500, the technician may directly couple the polarized image source 500 to the plate waveguide to eliminate the mirror image. In addition, the technical solution of the embodiment of FIG. 7 may also be implemented in combination with the solution of the embodiment of FIG. 4. The polarization state of the incident light 10 and the polarization selectivity of the cascaded splitting films 200 work together to improve the transmissivity in the angle range of mirror image light and the reflectance in the angle range of real incident light, thereby facilitating elimination of the mirror image.

Figure 11:
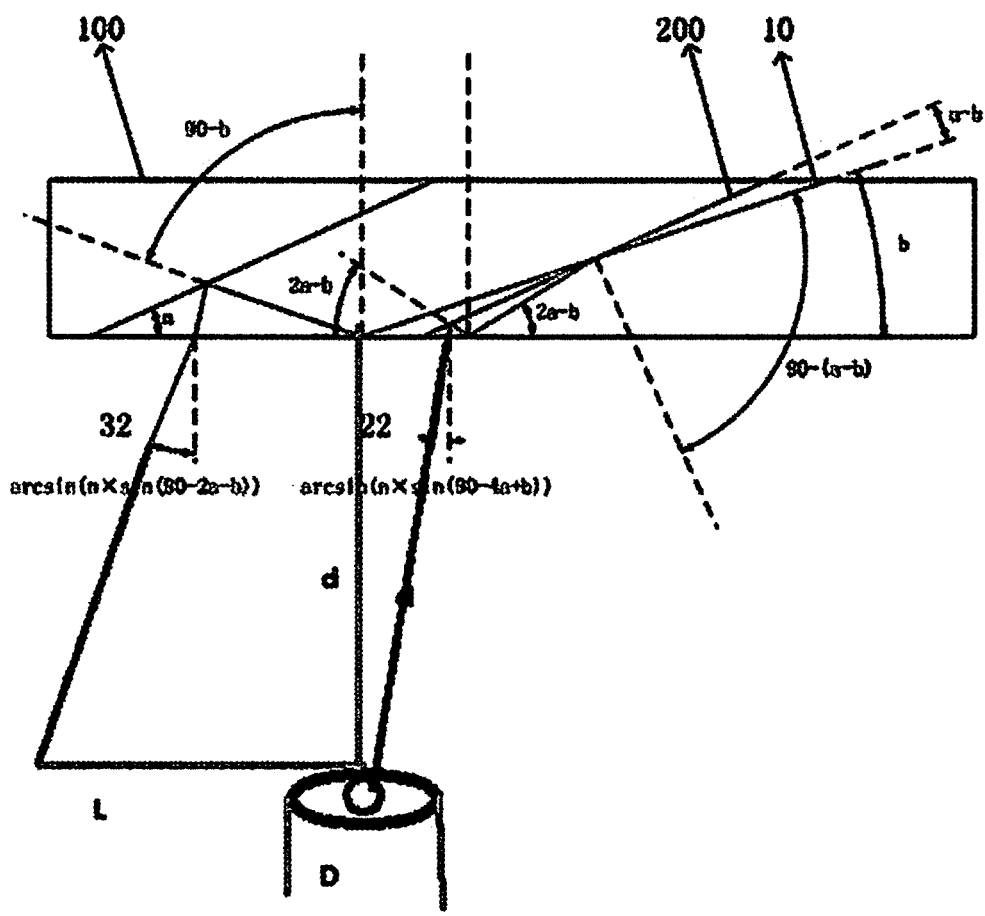
FIG. 11 is a schematic structural diagram of a plate waveguide according to a third embodiment of the present disclosure.

[Third Embodiment] FIG. 11 is a structural schematic diagram of a plate waveguide according to a third embodiment of the present disclosure. As shown in FIG. 11, the plate waveguide of the present embodiment includes the parallel plate 100 and the cascaded splitting films 20. The parallel plate 100 has upper and lower surfaces parallel to each other. The parallel plate 100 receives and transmits incident light 10 carrying the transmitted image. The cascaded splitting films 200 are disposed in the parallel plate 100 and are not parallel to the upper and lower surfaces of the parallel plate 100, and are configured for reflecting the incident light 10 out of the plate waveguide to form the ideal image.

It is assumed that the glass refractive index of the plate waveguide is n, the included angle between the cascaded splitting films 200 and the lower surface of the plate waveguide is a, the included angle between the incident light and the lower surface of the plate waveguide is b, and the field of view is 2ω. In order to eliminate the mirror image, the relationships among various parameters are studied. Usually the glass refractive index of the plate waveguide is greater than 1.5.

When the included angle between the cascaded splitting films 200 and the upper and lower surfaces of the parallel plate 100 is larger than or equal to the included angle between the center image light of the incident light and the upper and lower surfaces of the parallel plate 100 (a the refractive index of the parallel plate 100 and the field of view satisfy following relationships:

the condition where the left and right mirror images are separated, that is, the mirror images do not overlap, and there is no ghosting:

$$\arcsin(n\times\sin(90°-2a-b))-\arcsin(n\times\sin(90°-4a+b))>2\omega;$$

the condition where the incident light satisfies the total reflection transmission:

$$90°-b-\omega>\arcsin(1/n).$$

When the included angle between the cascaded splitting films 200 and the upper and lower surfaces of the parallel plate 100 is smaller than the included angle between the center image light of the incident light and the upper and lower surfaces of the parallel plate 100 (a<b), the refractive index of the parallel plate 100 and the field of view satisfy following relationships:

the condition where the left and right mirror images are separated, that is, the mirror image does not overlap with the ideal image, and there is no ghosting:

$$\arcsin(n\times\sin(90°-4a+b))+\arcsin(n\times\sin(2a+b-90°))>2\omega;$$

the condition where the incident light satisfies the total reflection transmission:

$$90°-b-\omega>\arcsin(1/n).$$

When the above two conditions are combined to express, the refractive index of the parallel plate 100 and the field of view satisfy following relationships:

the condition where the left and right mirror images are separated, that is, the mirror image not overlap with the ideal image, and there is no ghosting:

|arcsin($n$×sin(90°−4$a$+$b$))−arcsin($n$×sin(90°−2$a$−$b$))|>2ω;

the condition where the incident light satisfies the total reflection transmission:

90°−$b$−ω>arcsin(1/$n$).

With reference to FIGS. 2 and 3, when the refractive index of the parallel plate 100 and the field of view satisfy the above relationships, the mirror image reflected by the cascaded splitting films 200 has different angle from the ideal image. The two images are separated, and only the ideal image is present in the field of view, thereby eliminating the mirror image.

Considering practical applications such as a head-mounted display device shown in FIG. 11, it is assumed that the distance from the parallel plate of the plate waveguide to the pupil of the eye is d, and the diameter of the pupil of the eye is D. In general, d is 12 mm-20 mm, and D is 2 mm-8 mm.

When $a$>$b$, 90°−2$a$−$b$>90°−4$a$+$b$,

When the mirror image light and the real light enter by the eye distance, the horizontal deviation L is:

Tan(arcsin($n$×sin(90°−2$a$−$b$−ω))×$d$−Tan(arcsin($n$×sin(90°−4$a$+$b$+ω))×$d$.

When $a$<$b$, 90°−2$a$−$b$<90°−4$a$+$b$ when the mirror image light and the real light enter by the eye distance, the horizontal deviation L is:

Tan(arcsin($n$×sin(90°−4$a$+$b$−ω))×$d$−Tan(arcsin($n$×sin(90°−2$a$−$b$+ω))×$d$

In order for the eye to not receive the mirror image light, it is required to satisfy:

L>D/2, it is further required to satisfy L>D.

With reference to FIG. 11, when the refractive index of the parallel plate 100 and the field of view satisfy the above relationships, the mirror image reflected by the cascaded splitting films 200 is separated from the ideal image, and only the ideal image enters eye, thereby eliminating the mirror image.

It should be noted that the technical solution of this embodiment can be implemented independently by adjusting the refractive index of the parallel plate 100 and the field of view without adjusting the structure of the plate waveguide in the prior art or adding other hardware, so that the mirror image is eliminated. In addition, the technical solution of this embodiment can also be implemented in combination with the embodiment of FIG. 4. By adjusting the refractive index of the parallel plate 100 and the field of view, the transmission efficiency of the mirror image light 21 on the cascaded splitting films 200 and the reflection efficiency of the ideal image light 31 on the cascaded splitting films 200 can be further enhanced. Furthermore, the technical solution of this embodiment can also be implemented in combination with the embodiment of FIG. 7. The combined action of the polarization state of the incident light 10 and the adjustment of field of view may improve the transmittance within the incident angle range of mirror image light and the reflectance within the incident angle range of the ideal image light, which facilitates the elimination of mirror image.

The technical effect of the present disclosure is in that it effectively solves the problem of the mirror image in near-eye display system with the cascaded splitting films, reduces the brightness of the mirror image to less than 5% of the ideal image, and does not increase the volume and weight of the system. The adhesive layer has high uniformity, which increases the energy threshold of the transmitted beam and reduces the possibility of bursting in high-energy laser applications.

The above particular embodiments are only intended to further illustrate the purpose, technical solution and beneficial effects of the present disclosure. It should be understood that the above are only specific embodiments of the present disclosure and are not intended to limit the present disclosure. Within the scope and protection of the present disclosure, any modification, equivalent replacement, or improvement made within the spirit and principles of the present disclosure shall be included in the scope of the present disclosure.

The invention claimed is:

1. A plate waveguide, comprising:
   a parallel plate having two surfaces parallel to each other and configured for receiving and transmitting incident light carrying a transmitted image in the plate waveguide by total reflection; and
   cascaded splitting films disposed in the parallel plate and not parallel to an upper surface and a lower surface of the parallel plate, and configured for reflecting the incident light out of the plate waveguide to form an ideal image to an eye,
   a refractive index of the parallel plate, a field of view, an angle of the splitting films, and an angle of the incident light are required to satisfy the following relationships:
   a condition of total reflection transmission:

90°−$b$−ω>arcsin(1/$n$);

a condition where a mirror image does not overlap with the ideal image, and there is no ghosting:

|arcsin($n$×sin(90°−4$a$+$b$))−arcsin($n$×sin(90°−2$a$−$b$))|>2ω;

wherein, a is an included angle between the cascaded splitting films and the lower surface of the parallel plate;
   b is an included angle between a center image light of the incident light and the lower surface of the parallel plate;
   2ω is the field of view of the transmitted image in the plate waveguide, and w is half of the field of view of the transmitted image; and
   n is the refractive index of the parallel plate.

2. A plate waveguide, comprising:
   a parallel plate having two surfaces parallel to each other and configured for transmitting incident light carrying a transmitted image; and
   cascaded splitting films disposed in the parallel plate and not parallel to an upper surface and a lower surface of the parallel plate, and configured for reflecting the incident light out of the plate waveguide to form an ideal image to an eye, wherein an included angle between the cascaded splitting films and the lower surface of the plate waveguide is a, an included angle between a center image light of the incident light and the lower surface of the parallel plate is b, a field of view of the transmitted image in the plate waveguide is $2\omega$, half of the field of view of the transmitted image is $\omega$, an refractive index of the parallel plate is n, a distance from the parallel plate of the plate waveguide to a pupil of an eye is d, and a diameter of the pupil of the eye is D, when $a \geq b$, $90°-2a-b > 90°-4a+b$, when a mirror image light and an ideal image light at the distance enter the eye, a horizontal deviation L is:

$$\text{Tan}(\arcsin(n \times \sin(90°-2a-b-\omega)) \times d - \text{Tan}(\arcsin(n \times \sin(90°-4a+b+\omega)) \times d,$$

when $a<b$, $90°-2a-b < 90°-4a+b$, when the mirror image light and the ideal image light at the distance enter the eye, the horizontal deviation L is:

$$\text{Tan}(\arcsin(n \times \sin(90°-4a+b-\omega)) \times d - \text{Tan}(\arcsin(n \times \sin(90°-2a-b+\omega)) \times d,$$

and the following relationship is satisfied:

$$L > D/2.$$

3. The plate waveguide of claim 2, wherein, $$L > D.$$

4. The plate waveguide of claim 2, wherein, an incident angle at half maximum of reflectance of the cascaded splitting films is $90°-0.5\times(|a+b|+|a-b|)$;

a transmissivity of the cascaded splitting films in an incident angle range of the ideal image light [0, 90°−a−b+ω] is 1−R, 0.1≤R<0.5;

the transmissivity of the cascaded splitting films in an incident angle range of the mirror image light [90°−|b−a|−ω, 90°] is more than 96%;

the transmissivity of the cascaded splitting films at the incident angle at half maximum of reflectance is (2−R)/2, 0.1≤R<0.5, wherein, R is a reflectance.

5. A plate waveguide, comprising:

a parallel plate having two surfaces parallel to each other and configured for receiving and transmitting incident light carrying a transmitted image; and cascaded splitting films disposed in the parallel plate and not parallel to an upper surface and a lower surface of the parallel plate, and configured for reflecting the incident light out of the plate waveguide to form an ideal image to an eye, and an incident angle at half maximum of reflectance of the cascaded splitting films is $90°-0.5\times(|a+b|+|a-b|)$;

a transmissivity of the cascaded splitting films in an incident angle range of ideal image light [0, 90°−a−b+ω] is 1−R, 0.1≤R<0.5;

the transmissivity of the cascaded splitting films in an incident angle range of mirror image light [90°−|b−a|−ω, 90°] is more than 96%;

the transmissivity of the cascaded splitting films at the incident angle at half maximum of reflectance is (2−R)/2, 0.1≤R<0.5;

wherein, a is an included angle between the cascaded splitting films and the lower surface of the parallel plate;

b is an included angle between a center image light of the incident light and the lower surface of the parallel plate;

ω is half of a field of view of the transmitted image;

n is a refractive index of the parallel plate; and

R is a reflectance.

6. The plate waveguide of claim 5, wherein, when the included angle between the cascaded splitting films and the lower surface of the parallel plate is larger than or equal to the included angle between the center image light of the incident light and the lower surface of the parallel plate, the refractive index of the parallel plate and the field of view satisfy the following relationships:

$$\arcsin(n \times \sin(90°-2a-b)) - \arcsin(n \times \sin(90°-4a+b)) > 2\omega;$$

$$90°-b-\omega > \arcsin(1/n); \text{ and}$$

$$90°-2a+b-\omega > \arcsin(1/n).$$

7. The plate waveguide of claim 5, wherein, when the included angle between the cascaded splitting films and the lower surface of the parallel plate is smaller than the included angle between the center image light of the incident light and the lower surface of the parallel plate, the refractive index of the parallel plate and the field of view satisfy the following relationships:

$$\arcsin(n \times \sin(90°-4a+b)) + \arcsin(n \times \sin(2a+b-90°)) > 2\omega;$$

$$90°-b-\omega > \arcsin(1/n); \text{ and}$$

$$90°-2a+b-\omega > \arcsin(1/n).$$

8. The plate waveguide of claim 1, wherein, the refractive index of the parallel plate is larger than 1.5.

9. The plate waveguide of claim 1, wherein, the incident light has a predetermined polarization state, and the plate waveguide further comprises quarter-wave plates disposed on the upper and lower surfaces of the parallel plate respectively and configured for totally reflecting the incident light and switching the predetermined polarization state of the incident light.

10. The plate waveguide of claim 9, wherein, the polarization state of the incident light is P state or S state, and the cascaded splitting films have a polarization selectivity and transmits all S-state light or all P-state light and reflects part of the other polarization state light.

11. The plate waveguide of claim 10, wherein, when the polarization state of the incident light is the P state and a first reflection occurs on the lower surface of the parallel plate, the P-state light is switched to the S-state light after an odd number times of reflections on the upper and lower surfaces of the parallel plate, and the S-state light is switched to the P-state light after an even number times of reflections on the upper and lower surfaces of the parallel plate, and the cascaded splitting films transmit all the P-state light and reflect part of the S-state light, or transmit all the S-state light and reflect part of the P-state light.

12. The plate waveguide of claim 10, wherein, when the polarization state of the incident light is the P state and a first reflection occurs on the upper surface of the parallel, the P-state light is switched to the S-state light after an odd number times of reflections on the upper and lower surfaces of the parallel plate, and the S-state light is switched to the P-state light after an even number times of reflections on the upper and lower surfaces of the parallel plate, and the cascaded splitting films transmit all the P-state light and reflect part of the S-state light, or transmit all the S-state light and reflect part of the P-state light.

13. The plate waveguide of claim 10, wherein, when the polarization state of the incident light is the S state and a first reflection occurs on the lower surface of the parallel, the S-state light is switched to the P-state light after an odd number times of reflections on the upper and lower surfaces of the parallel plate, and the P-state light is switched to the S-state light after an even number times of reflections on the upper and lower surfaces of the parallel plate, and the cascaded splitting films transmit all the P-state light and reflect part of the S-state light, or transmit all the S-state light and reflect part of the P-state light.

14. The plate waveguide of claim 10, wherein,
when the polarization state of the incident light is the S state and a first reflection occurs on the upper surface of the parallel, the S-state light is switched to the P-state light after an odd number times of reflections on the upper and lower surfaces of the parallel plate, and the P-state light is switched to the S-state light after an even number times of reflections on the upper and lower surfaces of the parallel plate, and the cascaded splitting films transmit all the P-state light and reflect part of the S-state light, or transmit all the S-state light and reflect part of the P-state light.

15. The plate waveguide of claim 2, wherein,
the refractive index of the parallel plate is larger than 1.5.

16. The plate waveguide of claim 5, wherein,
the refractive index of the parallel plate is larger than 1.5.

17. The plate waveguide of claim 2, wherein,
the incident light has a predetermined polarization state, and the plate waveguide further comprises quarter-wave plates disposed on the upper and lower surfaces of the parallel plate respectively and configured for totally reflecting the incident light and switching the predetermined polarization state of the incident light.

18. The plate waveguide of claim 5, wherein,
the incident light has a predetermined polarization state, and the plate waveguide further comprises quarter-wave plates disposed on the upper and lower surfaces of the parallel plate respectively and configured for totally reflecting the incident light and switching the predetermined polarization state of the incident light.

* * * * *